US006270029B1

(12) United States Patent
Dünner et al.

(10) Patent No.: US 6,270,029 B1
(45) Date of Patent: Aug. 7, 2001

(54) SPIRAL STORAGE

(75) Inventors: Albert Dünner, Zürich; Edmund Fendt, Schneisingen; Hans Frei, Auenstein; Werner Gassmann, Würenlos, all of (CH)

(73) Assignee: Gretag Imaging AG, Regensdorf (CH)

( * ) Notice: Subject to any disclaimer, the term of this patent is extended or adjusted under 35 U.S.C. 154(b) by 0 days.

(21) Appl. No.: 09/157,986

(22) Filed: Sep. 22, 1998

(30) Foreign Application Priority Data

Sep. 23, 1997 (DE) .......................................... 297 17 019 U

(51) Int. Cl.[7] .................................................. G11B 25/06
(52) U.S. Cl. .......................................... 242/328; 242/328.2
(58) Field of Search ................................. 242/328, 328.2, 242/364.1

(56) References Cited

U.S. PATENT DOCUMENTS 1,713,939 * 5/1929 Wingren .
2,398,639 * 4/1946 Heyer ................................... 242/328
3,034,399 * 5/1962 Goepel .
4,169,566 * 10/1979 Boudouris et al. ................ 242/55.18

FOREIGN PATENT DOCUMENTS

2600208 * 4/1977 (DE) .
1952592 * 6/1978 (DE) .
3715179C2 * 6/1989 (DE) .
0730199A1 * 3/1995 (EP) .

* cited by examiner

Primary Examiner—John Q. Nguyen
(74) Attorney, Agent, or Firm—Burns, Doane, Swecker & Mathis, LLP

(57) ABSTRACT

A storage for photographic material with a base (20, 120, 220) rotatable around an axis (30), with an input arrangement (16, 116) positioned at an outer circumference of the base, with a removal arrangement (18, 118) positioned at the axis (30, 130) of the base (20, 120, 220), whereby two photographic material belts are wound/unwound, and, in particular, one close to the axis (30, 130) and one close to the outer circumference of the base (20, 120), whereby a loop (42) between the belts leads to a photographic material exchange from the outer belt to the inner belt, whereby the winding direction is preferably reversed, whereby, the base (20, 120) is divided into two sections (12, 14; 112, 114; 212, 214), whereby the one section (14; 114; 214) surrounds the other section (12; 112; 212).

18 Claims, 5 Drawing Sheets

SPIRAL STORAGE

FIELD OF THE INVENTION

The invention relates to a storage for a strip-shaped photographic printing material as known from EP 0 730 199 A1. Such a storage is described by the features listed in the preamble of claim 1.

BACKGROUND OF THE INVENTION

This generic storage arrangement is used, for example, in large labs in order to overcome the enormous space requirement of conventional storage. Conventional storage arrangements include an arrangement of vertically or horizontally moveable rollers around which the photographic material is guided, whereby printing material is temporarily stored by way of the horizontal or vertical displacement of the rollers.

The above generic storage should now be used here as replacement for the prior art storage arrangement. However, the generic storage arrangement has problems which can impede its use. A photographic paper is fed to the generic storage arrangement from the outside. It is initially automatically threaded from the outside into the output which is located in the center of the storage As soon as the threading-in process is successfully completed, the support disk of the storage arrangement commences to rotate with a preset speed, while photographic paper is fed thereinto from the outside. The photographic material is stored under formation of a loop in an inner belt and an outer belt, A free space remains between the inner belt and the outer belt wherein the loop can travel, whereby the photographic paper, which originally was fed from the outside and is wound onto the outside of the outer belt, is transferred through the traveling loop from the outer belt to the inner belt, whereby the winding direction is reversed. Correspondingly, when photographic paper is to be removed from the known generic storage, it can be removed from the inner circumference of the inner belt.

This now creates the problem that the radius of the outer photographic paper belt can get too large so that the storage only then works reliably when it is at least initially mainly loaded and, subsequently, at least mainly unloaded again. Problems can also be encountered with this storage in intermediate conditions, whereby it is significant that large forces may act on the photographic paper during unloading of the storage, which can cause it to rip, since large friction forces must be overcome when the photographic paper is removed from the inner belt of the storage through the pullout.

SUMMARY OF THE INVENTION

It is an object of the present invention to provide a storage which overcomes the disadvantages of the prior art as much as possible, or at least partly removes the mentioned problems, This object is achieved with a storage with the features recited in claim 1. Practical embodiments of the storage are apparent from the dependent claims. An especially advantageous aspect of the invention is apparent from claim 6.

The advantages to be achieved in accordance with the invention are based on that the support platform, which is here also referred to as base, can be divided into two sections, whereby one section surrounds the other section. In this embodiment, it is possible to rotate the inner section as well as the outer section, if desired, with different speeds, whereby both sections can also be locked with one another, for example, by way of a clutch, in order to be synchronously rotatable. During filling of the storage, the outer section and the other section, i.e., the inner section, can be locked with one another to form the inner belt as well as the outer belt of photographic material by forming the loop. If the storage is to be unloaded, the inner section is uncoupled from the outer section and can be rotated according to the pullout speed for the photographic material, whereby the forces acting on the photographic material can be quite significantly reduced.

The storage is thereby used, according to the invention, as follows, especially for intermittent storage: initially the base or supporting disk is rotated in a preselected feed direction of the photographic paper, wherein the photographic paper is fed, so that the outer belt forms on the supporting disk. On the pullout arrangement or discharge arrangement adjacent side of the base or the supporting disk, the photographic paper is held stationary for at least some time relative to the discharge arrangement, namely when only photographic paper for filling of the storage is fed thereto. The feeding of the photographic paper is thereby carried out in such a way that a loop is formed on the base between the intermittently held stationary photo paper section, i.e., the inner belt, and the photographic paper section being fed to the base, i.e., the outer belt Together with the supply of photographic paper, the loop is guided around the discharge arrangement at the center of the base, or close to the axis of the base. The temporarily fixed photographic paper section, i.e., the inner belt, is thereby wound around the discharge arrangement or the center axis or rotational axis of the base. Upon discharge of the storage, the at least temporarily fastened photographic paper section, i.e., the inner belt, is removed through an inner region of the base or through the discharge arrangement, whereby the discharge arrangement, for example, includes rollers over which the temporarily fastened photographic paper section, i.e., the inner belt, is transported in a discharge direction. The discharge can thereby be carried out downward through an opening in the base, as well as upward, depending on whether or not a cutout is provided in the base in the center of the base close the axis of the base, through which the photographic paper can be removed. In order to prevent that the radius of the outer belt increases too much and, thereby, the photographic paper on the inside of the belt is forced inward towards the axis of the base, the feeding could be done for special uses from the inside and removal on the outside. With this reversal, problems in the region of the inner belt or winder can appear when the photographic paper must be pushed from its inner region to its outer region.

As mentioned above, the inner section of the base is uncoupled from the outer section of the base during removal from the inner belt. Correspondingly, during fitting through the middle of the base and removal at the periphery of the base, the outer section of the base is uncoupled from the inner section and runs with the photographic paper to be removed according the removal speed and uncoupled from the inner section of the base.

It is, of course, further possible to rotate the inner section as well as the outer section of the base at different speeds. Differences in diameter of the inner and outer belts can hereby be compensated, for example, when, while the inner circumference of the outer belt is about four times the outer circumference of the inner belt, the inner section is rotated with correspondingly more rotations in order to allow a sufficient transfer of photographic material from the outer belt to the inner belt A further very advantageous embodiment of the storage, in accordance with the invention, is achieved when one of the sections, especially the section on which the feeding takes place, for example, the outer section, is sloped towards the axis of rotation of the base. The other section, especially the inner section, can thereby be constructed flat, whereby it can also be advantageous for the outer section to be sloped in only a region so that, for example, a slope of any type is provided between the periphery of the outer section and the middle of the outer section which extends radially inwardly and then merges with a planar section which essentially corresponds with the plane of the inner section. In that at least part of the outer section is sloped radially inwardly, the fed photographic material or photo paper tends to slide down the slope. The outer belt generated during loading of the storage is thereby kept away over a long period of time from a border which may surround the outer section. Furthermore, because of the slope, the outer belt will always have a tendency to preferably move inward during the storing operation so that the contact of the outer belt with the possibly present border of the base of the supporting disk can be delayed over a long period of time. Only in the region in which the loop is formed, should the base normally be not provided with a slope in order to not unnecessarily force the photographic paper.

Correspondingly, in case the storage is loaded from the center of the base and the discharging of the storage is performed at the periphery of the base, the inner section should be provided with a corresponding slope.

The mentioned slope can be formed as a uniformly inwardly directed slope It is, however, also possible to form the slope with an arcuate, concave, or similar shape, for example, in order to provide a large decline close to the edge of the outer or inner section, which flattens out towards the region of the base where the loop is formed and merges with a plane or with a horizontal surface. In this manner, it is possible to automatically expose the outer or inner belt to a higher radially inwardly directed force, when the thickness of the respective belt is such that it approaches the edge of the base or the border of the base.

In addition it is possible in combination with the slope of at least one of the sections, or also separately, to provide a pressure roller or redirecting roller at the outer periphery of the outer section or the outer belt of photo material, which forces the outer belt of photo paper or photographic material radially inwardly on the base This embodiment separately or in support provides results and advantages which are comparable to those of the slope of at least one of the sections of the base, as described above.

The mentioned roller or cylinder can be biased radially inwardly towards the axis of rotation of the base, for example, by way of a spring. The mentioned roller or cylinder can be located adjacent the feeding arrangement or directly at the mouth thereof, whereby the feeding arrangement can be provided with a feeding channel in the form of a swivel arm.

Of course, instead of a single, for example, spring-loaded roller or cylinder, several, at least partly driven rollers or cylinders can be provided along the periphery of the base or the outer section, which force the outer belt of photographic material radially inwardly.

It is especially preferred when the rollers or cylinders are synchronously driven at the feeding speed of the photographic paper. A belt or band can be provided therefore which surrounds and drives the rollers or cylinders in the region or outside the region of the belt of photographic maternal. In the case where the belt surrounds the rollers of cylinders in the region of the outer circumference of the outer belt, the inlet region of the feeding arrangement or the swivel arm associated therewith must be kept free. Where the rollers or cylinders are driven by way of a belt outside the circumferential region of the outer belt, the belt need not be redirected or interrupted in the region of the mouth of the input arrangement or the swivel arm. In case of a redirecting or interrupting of the belt or the band, it is required that the belt or band is guided, especially, at the radially inwardly directed circumferential region of the rollers or cylinders, but possibly also at their, relative to the axis of the base, radially outwardly directed side in order to thereby achieve an endless belt or band which runs at each point of the outer circumference of the outer belt at the synchronous speed. The belt or band can thereby be guided on the inside, for example, over opposing rollers, while the mentioned rollers or cylinders themselves carry out the guiding function on the outside.

BRIEF DESCRIPTION OF THE DRAWINGS

The present invention will be further described in the following by way of the attached Figures and with reference to preferred embodiments. Thereby show.

DETAILED DISCUSSION OF THE PREFERRED EMBODIMENT

The same or at least functionally equivalent parts in different Figures have been respectfully provided with reference numbers which differ by 100 (for example, 14 corresponds to 114, corresponds to 214).

In the following figure discussion, further objects, advantages and features according to the invention, are also disclosed which may be considered essential to the invention with respect to specific prior art.

Figure 1:
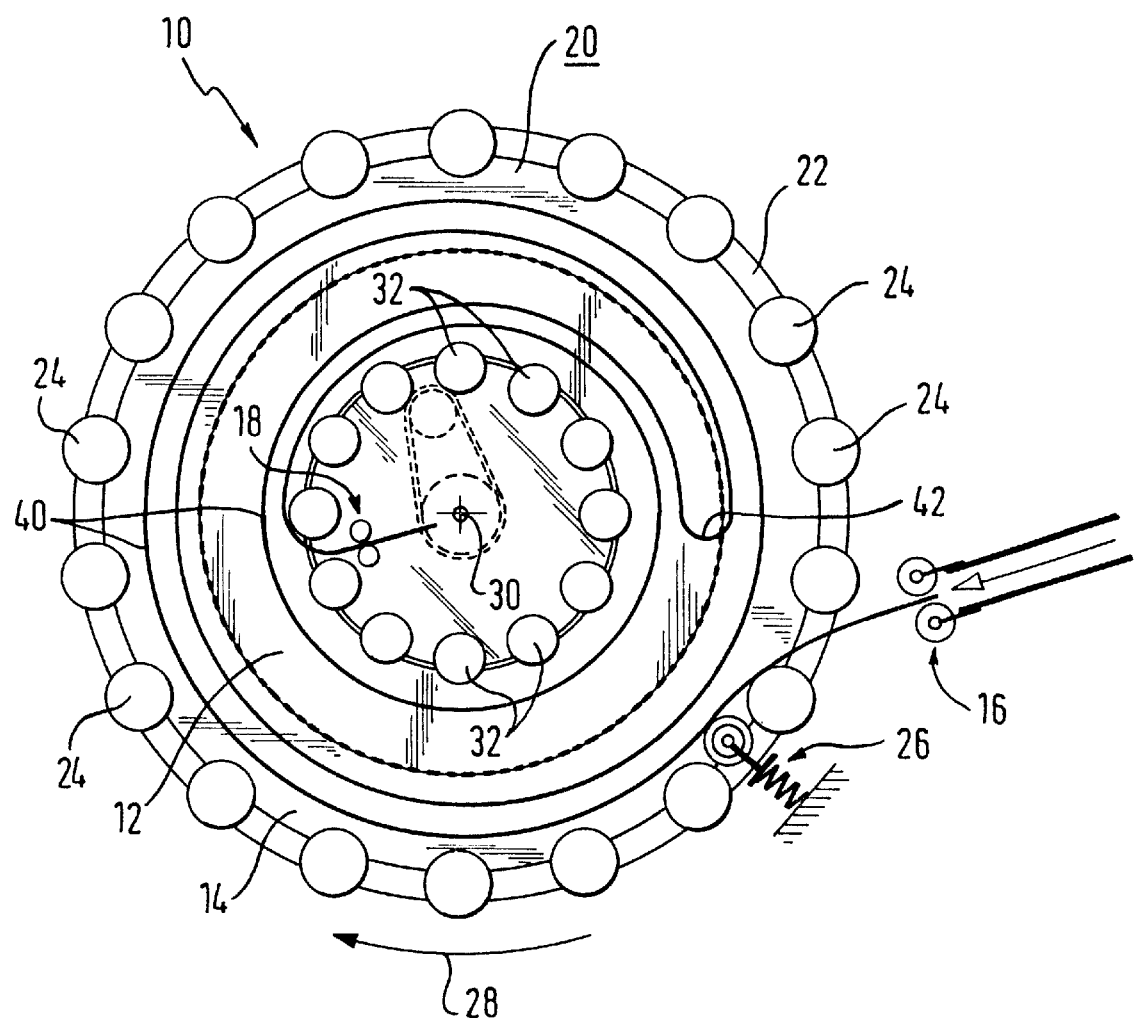
FIG. 1 a schematic top view of one embodiment with features according to the invention.

FIG. 1 shows a storage 10 in a partially filled condition. FIG. 1 shows that the photographic paper 40, 42 is guided into the storage at the outer region of the storage interior and over the input arrangement 16. With the illustrated storage 10, it is possible to synchronously feed photographic material to and remove photographic material from the storage. Conversely, it is also possible to exclusively remove photographic material or exclusively feed photographic material, until the storage is filled or empty.

In the illustrated example, it is first assumed that the storage 10 is only filled by way of the input arrangement 16, while, at the moment, no photographic material is removed by way of the pullout arrangement or removal arrangement 18, so that the rollers of the pullout arrangement 18, at the moment, only hold the photographic material.

The base or supporting disk 20 is divided into two sections 12, 14, and their respective edge lines are shown in broken lines. Both sections, i.e., the inner section 12 and the outer section 14 can be synchronously moved, for example, by coupling the two sections 12, 14 by way of a coupling arrangement, for example, a magnetic or mechanical coupling. Correspondingly, the two sections 12, 14 can also be independently actively and/or passively moved. A holder 22 is provided at the outer circumference of the base 20 or the outer section 14 of the outer base 20, which includes several passive rollers 24. During feeding of photographic material over the input arrangement 16, the outer belt of photographic material may grow to such an extent that it abuts on the outside so that increased friction forces may be created. This can be at least partly prevented by way of the passively following rollers 24.

With respect to details of the input arrangement 16, the positioning of the rollers 24 and of the pullout 18, reference is had to the generic publication EP 0 730 199 A1, the disclosure of which is herewith expressly incorporated into the present disclosure. Parts and features, as well as combinations of features of the generic publication, can also be claimed herein.

Figure 5:
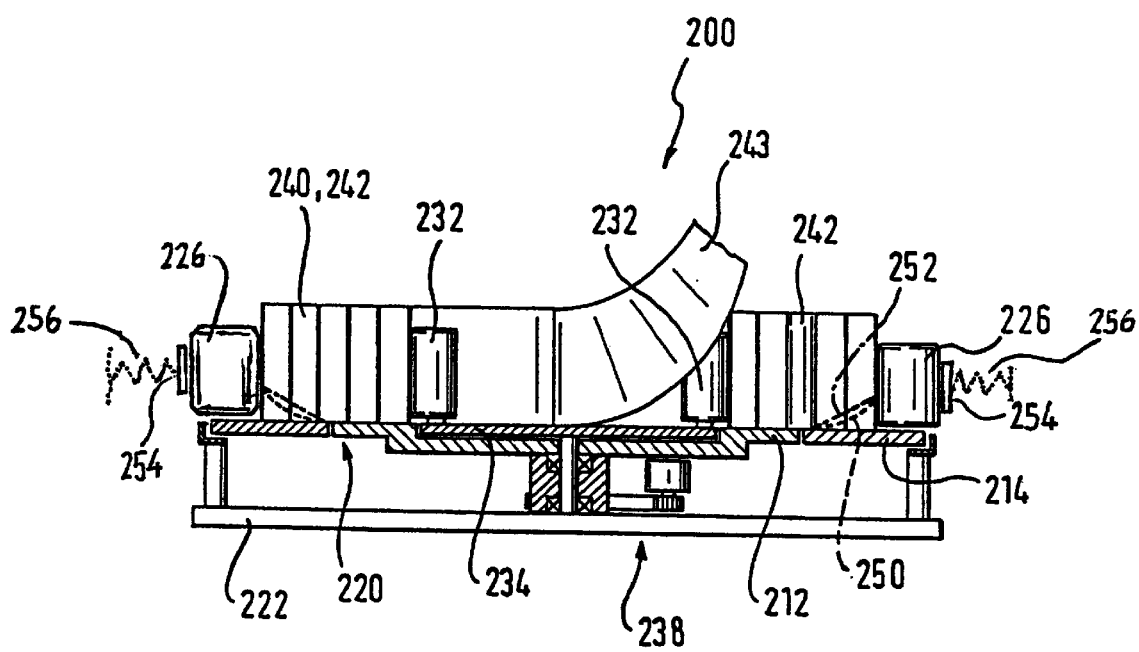
FIG. 5 a section through view with features according to another embodiment of the present invention.

Close to the input arrangement 16, a pressing arrangement 26 is provided which here in a simplified embodiment consists of a roller or cylinder, which may be driven, and which is pressed against the photographic material or the outer circumference of the outer belt of photographic material by way of a spring arrangement, in order to exert a radially inwardly directed force thereon. Alternatively, as shown in FIG. 5, pressing arrangement 226 may consist of several rollers or cylinders that are surrounded and driven by band 254. Band 254 may optionally be radially inwardly biased by spring arrangements 256 (shown in dotted lines).

Figure 4:
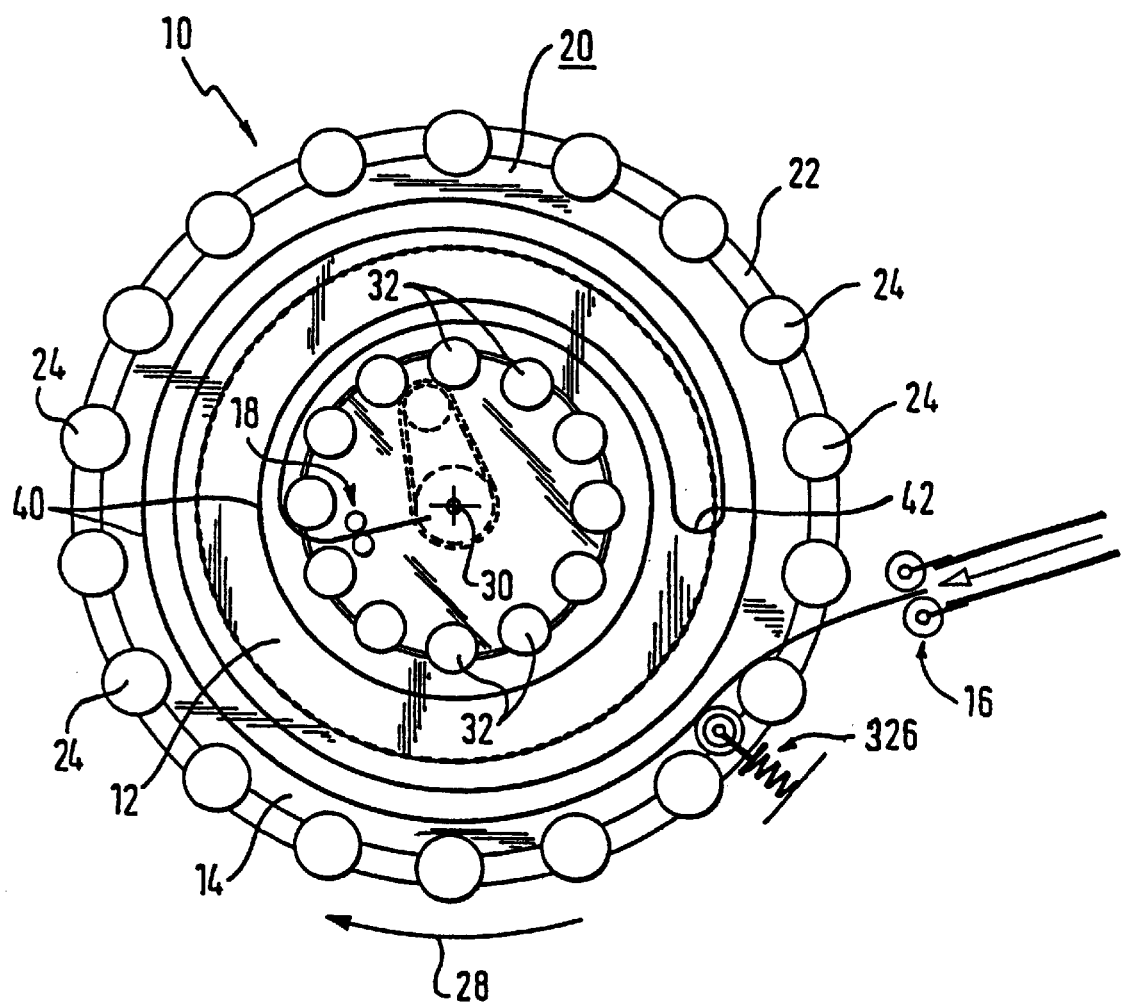
FIG. 4 a schematic top view with features according to another embodiment of the present invention.

The pressing arrangement can be positioned such that it rotates together with the outer section 14. This is represented in FIG. 4, where pressing arrangement 326 is positioned to rotate together with outer section 14 in, for example, direction 28. Pressing arrangement 16, 326 can also be positioned at the input arrangement.

Close to the pullout arrangement 18, rollers 32 can also be provided in a circle around the axis 30 of the base 20, which principally have the same function as the rollers 24 provided on the outside.

A drive arrangement is schematically illustrated at the axis 30 which is further described in the generic publication and which is only of little significance with respect to the present invention. It is essential, with respect to the present invention, that the outer section 14 as well as the inner section 12 can be moved independently of one another or synchronously or can be moved connected together. Of course, respective drives and the like must be provided therefor. It is equally required to provide a control which appropriately controls the inner section 12 and outer section 14 of the base.

Instead of the one pressing arrangement 26 in form of one roller, several rolls can be provided which are distributed along the outer circumference of the outer belt. These rolls can be synchronized by way of a belt, whereby the belt also acts on the outer circumference of the outer belt of photographic material.

With respect to the storage 10, 100, 200 according to the drawings of the present invention, it is clear that it can be used for the storage of photo sensitive as well as already exposed/developed photographic material. If light-sensitive material is to be stored, the storage, of course, includes a light-proof housing, a light-proof inlet, as well as a light-proof outlet It is also possible to position several of the illustrated storage arrangements one above the another or in line one behind the other, in order to increase the storage capacity. In this case, the controls of the storage arrangements must be correspondingly coupled with each other.

Accordingly, two redirecting switches are required at the input and the outlet of the storage respectively when it includes two bases, for example, one on top of the other. Furthermore, it is also possible to feed the photographic paper from the outside to the upper storage and remove it on the inside, while the storage therebelow is loaded from the inside and the photographic paper is removed at the outside, or vise versa.

Figure 2:
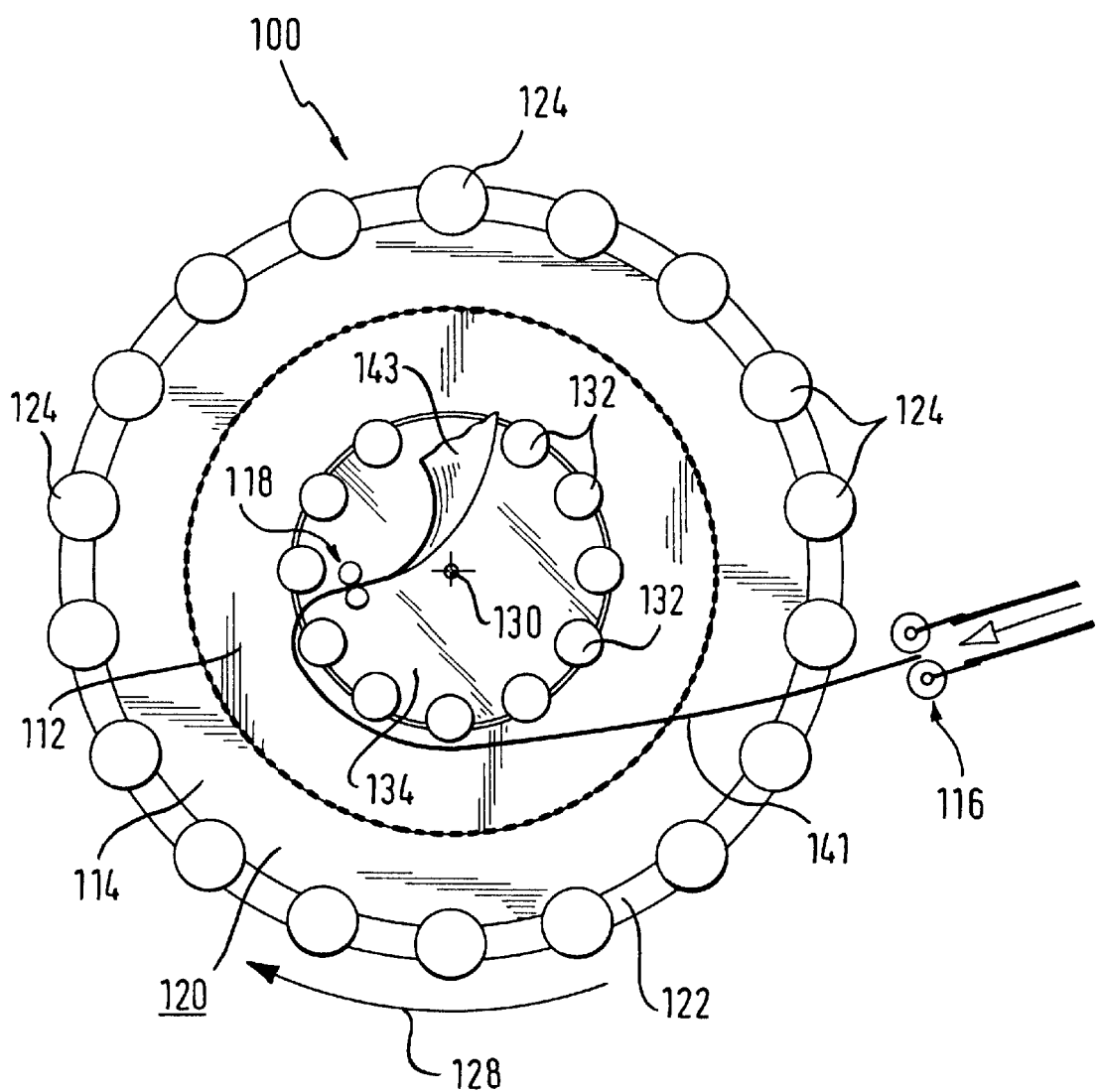
FIG. 2 a schematic top view of another embodiment with features according to the invention in a specific functional state.

Referring now to FIG. 2, the embodiment 100, as well as the embodiment 10 according to FIG. 1, include a base plate 122 on which the rollers 124 are mounted, which are passive and which are positioned to support the outer belt of photographic material along its outer circumference, without generating excessive, frictional forces.

The inner disk 134 can be fixed relative to the base 120 or the sections 112, 114, which means it does not rotate therewith, when the mentioned components are moved, or a cutout is provided instead of the disk 134. In case the disk 134 is provided, the photographic material is removed upward from the illustrated plane of the base 120, as illustrated by way of the photographic material section 143. In the case where only a cutout is provided instead of the disk 134, the photographic material 143 can also be removed downwardly, whereby then, of course, the pullout arrangement 118 must be correspondingly differently oriented or positioned. As in the embodiment according to FIG. 1, the base 120 during loading of the storage 100 (and also the storage 10) rotates in direction of the arrow 128 (28 in FIG. 1). During threading of the photographic material 141, it is initially guided into the storage 100 through the input arrangement 116. is grabbed by the rollers or feed rollers of the pullout arrangement 118 and subsequently deposited within the storage in the above-described two belt arrangements with intermediate loop. Referring to FIG. 1 as well as FIG. 2, an outer belt of photographic material is formed during rotation of the base 120 or 20 in direction of the arrow 28, 128, as apparent especially from FIG. 1, which translates into an inner belt through a moving loop 42 (FIG. 1), which inner belt can then be pulled from the storage 10, 100 through the pullout arrangement 18. When photographic material is to be removed, the inner section 12, 112 can be rotated independently of the outer section 14, 114 of the base 20, 120 in order to positively influence in this way the pull and frictional forces acting on the photographic material.

In summary, it can be said that the base 20, 120 is rotated for a storing operation in a preselected feeding direction 128 of the photographic material, while the photographic material is loaded. In this way, an outer belt is formed on the base 20, 120. The photographic paper is held stationary relative to the disk 134 or the pullout arrangement 118 during loading or pulled out during unloading. The photographic paper is thereby loaded in such a way that a loop 42 (FIG. 1) is formed on the base 20, 120 between the at least temporarily fixed photographic material section or the inner belt and the base 20, 120, whereby the loop 42 with the feeding of the photographic material is guided around the disk 134 or the cutout provided thereat, however, definitely around the pullout arrangement 118, 18 While the loop moves on a circular path, the at least temporarily fixed photographic paper section is wound around the disk 134 or the corresponding cutout, but definitely around the pullout arrangement 18, 118.

During unloading of the photographic material from the storage 10, 100, the inner section 12, 112 of the base 20, 120 can be rotated independently of the outer section 14, 114.

Figure 3:
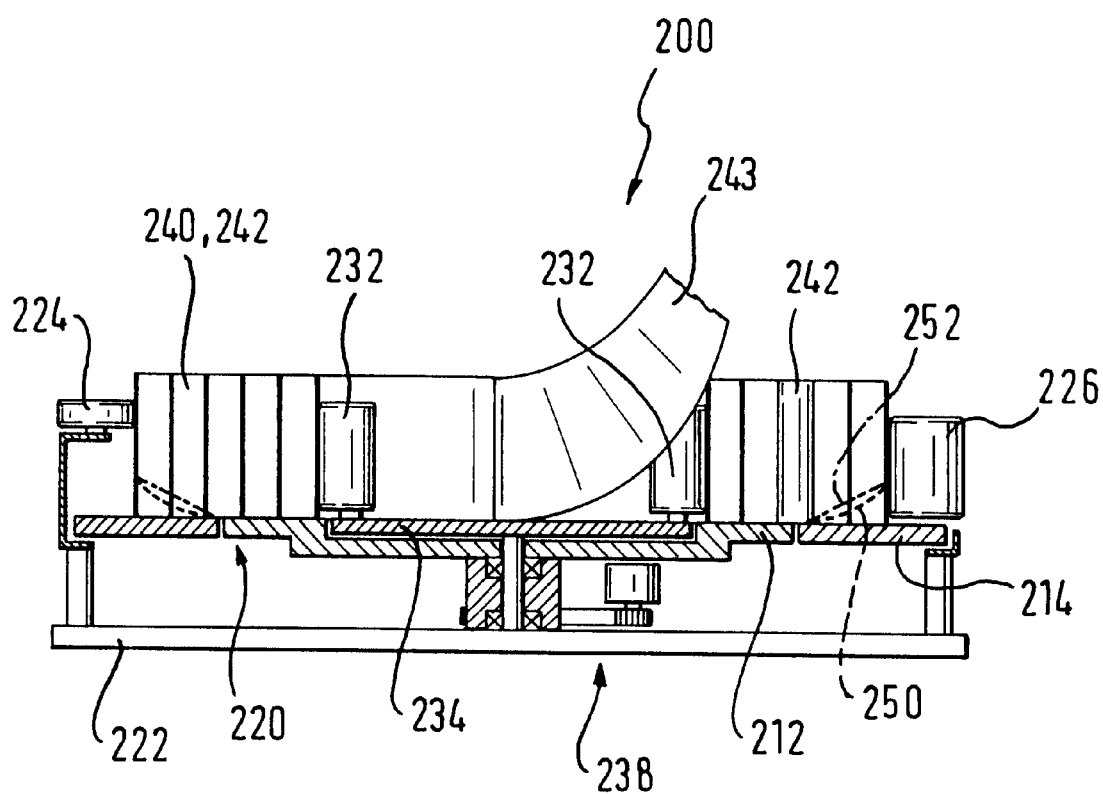
FIG. 3 a section through an embodiment with features according to the invention.

FIG. 3 shows a further embodiment of a storage 200 with features according to the invention. Several components of the above embodiments 10, 100 are also provided therein, whereby especially components of the embodiment according to FIG. 1 are used.

Contrary to FIG. 1, the separation of the base 220 into an inner section 212 and outer section 214 is separately shown in FIG. 3. The loop 242 is found in the region of the separating line between the sections 212 and 214.

It is significant that the outer section 214 of the base 220 can be provided with a slope which decreases inwardly towards the center of the base. The slope can be in the form of a schematically illustrated inclined plane 252 or also as a slope in the form of a circular section, in order to impose on the outer belt of photographic material an orientation towards the center of the base 220.

With respect to the general function of the storage, reference is here also had to the disclosure of the generic publication which is incorporated herein by reference.

A further embodiment is described with reference to FIG. 1, wherein the outer section 14 surrounds the rollers 24. The pressure arrangement or roller 26 is here not provided. One of the several rollers 24 is here used as a redirecting roller, whereby here the loop 42 cannot freely move, but is guided around the redirecting roller, whereby the remaining rollers 24 are only used for the supporting and guiding of the outer belt which forms on the outer section 14. The inner section 12 must here also be rotated relative to the outer section with a different or higher rotational speed to take into consideration the different diameters or circumferences of the outer belt and the inner belt The rollers 24 and, especially, the redirecting roller itself, can thereby also be rotatable around the axis or rotation of the base, preferably also separately rotatable relative to the outer section 14. This should prevent the outer belt becoming excessively thick and guarantees that photographic paper is continuously transferred to an appropriate degree to the inner belt

What is claimed is:

1. Storage for photographic material, comprising:
    a base rotatable around an axis, wherein the base is divided into a pair of independently rotatable inner and outer sections, the outer section surrounding the inner section;
    means for locking the outer section to the inner section for rotation together;
    an input arrangement positioned at an outer circumference of the base;
    a pullout arrangement positioned at the axis of the base;
    whereby an inner photographic material belt is wound or unwound adjacent to the axis of the base and an outer photographic material belt is wound or unwound adjacent to the outer circumference of the base, whereby a loop is formed between the belts and provides photographic material exchange from the outer photographic material belt to the inner photographic material belt.

2. Storage according to claim 1, wherein the means for locking is a magnetic coupling.

3. Storage according to claim 1, wherein the two sections can be locked together or synchronously moved.

4. Storage according to claim 1, wherein at least one of the inner and outer sections has regions downwardly inclined towards the axis.

5. Storage according to claim 4, wherein one of the outer and inner sections at least in a region has an arcuate, concave, or convex cross section.

6. Storage according to claim 1, wherein at least one pressure roller is provided in an outer region of the outer section.

7. Storage according to claim 6, wherein especially equidistantly spaced pressure rollers are provided along the outer circumference of the outer section.

8. Storage according to claim 6, wherein especially equidistantly spaced rollers are provided at an inner circumference of the outer section, whereby the loop is guided around one of the rollers which operates as a redirecting roller, while the outer photographic material belt is formed around the rollers.

9. Storage according to claim 6, wherein the at least one pressure roller is synchronously driven.

10. Storage according to claim 6, wherein a band is positioned around the at least one pressure roller.

11. Storage according to claim 10, wherein the band is radially inwardly biased by spring arrangements.

12. Storage according to claim 6, wherein the at least one pressure roller is radially inwardly biased by spring arrangements.

13. Storage of claim 6, wherein the at least one pressure roller is provided in the region of the input arrangement and does not rotate with the outer section.

14. Storage of claim 6, wherein the at least one pressure roller rotates with the outer section.

15. Storage according to claim 1, wherein two storage arrangements are positioned one above the other.

16. Storage of claim 1, wherein the outer photographic material belt is wound in a first direction and the inner photographic material belt is wound in a second direction.

17. Storage according to claim 1, wherein the means for locking is a mechanical coupling.

18. A method for storing photographic material using a base rotatable around an axis and comprising an outer section and an inner section, comprising the steps of:
    locking the outer section to the inner section, wherein the outer section and the inner section are independently rotatable around the axis;
    rotating the outer section and the inner section together in a first rotational direction to feed a photographic material onto the base;
    unlocking the outer section from the inner section; and
    rotating the inner section in a second rotational direction to remove the photographic material from the base.

* * * * *